Figure 1:
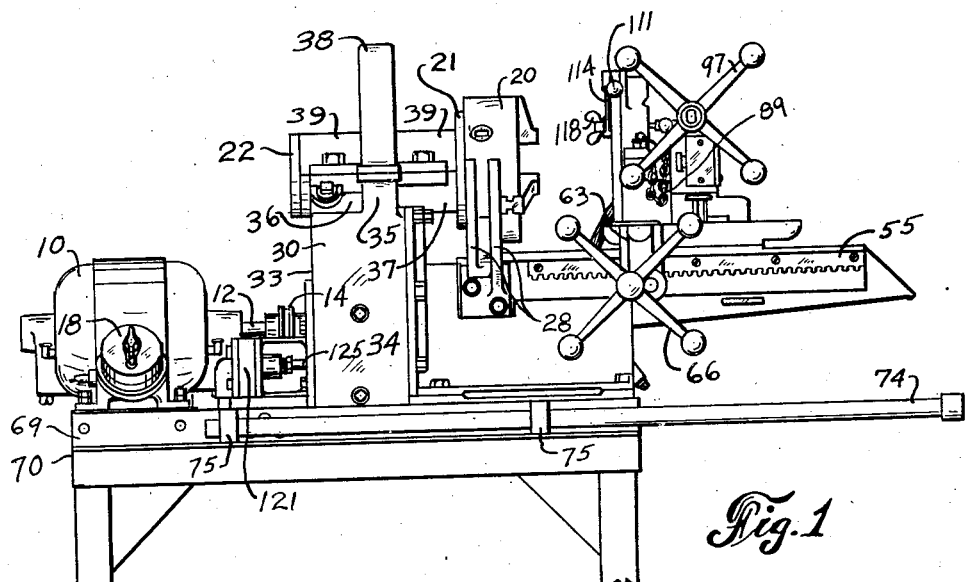

Feb. 20, 1934.    R. B. PEALER    1,947,874
PIPE THREADING MACHINE
Filed Sept. 14, 1931    4 Sheets-Sheet 1

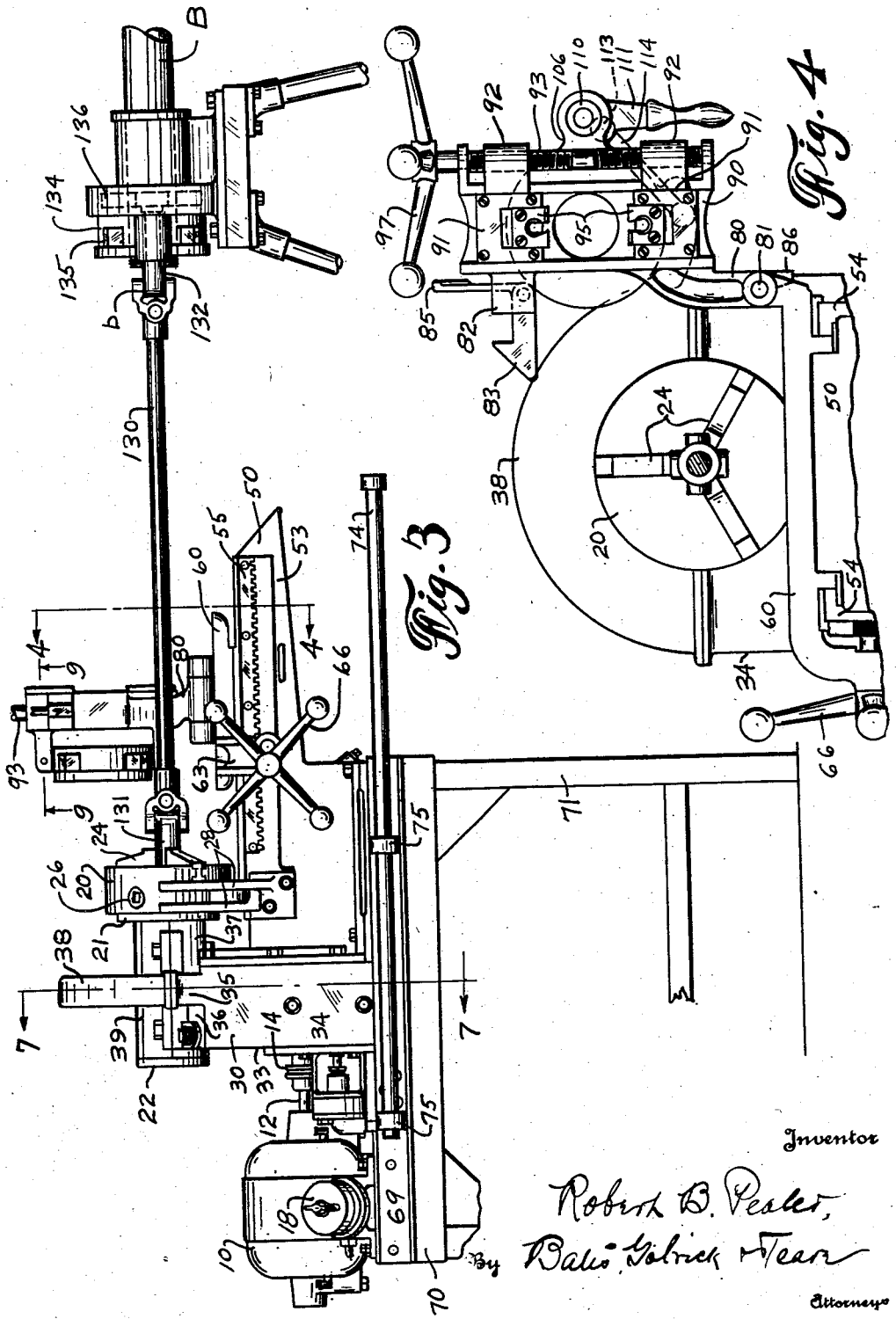

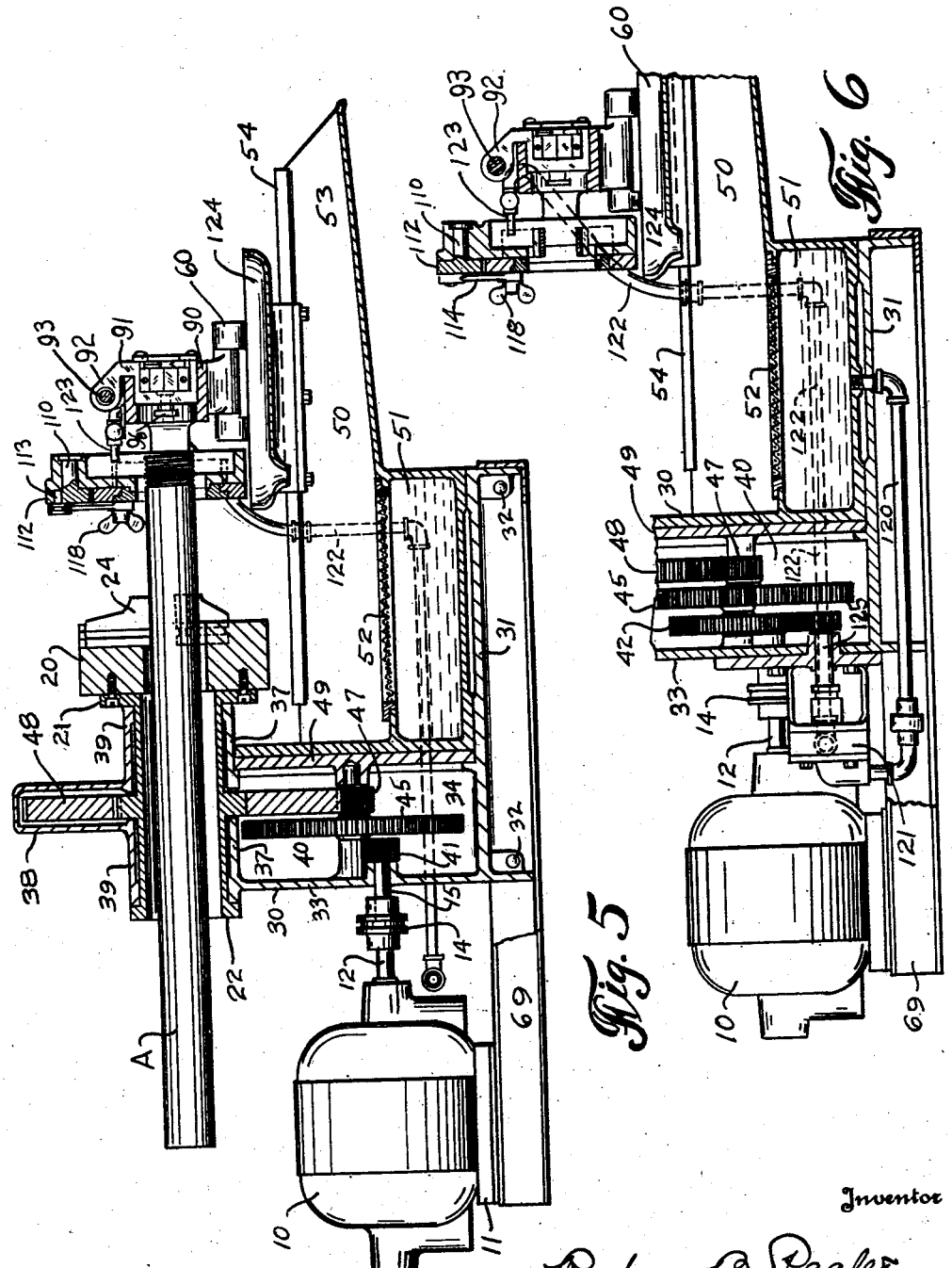

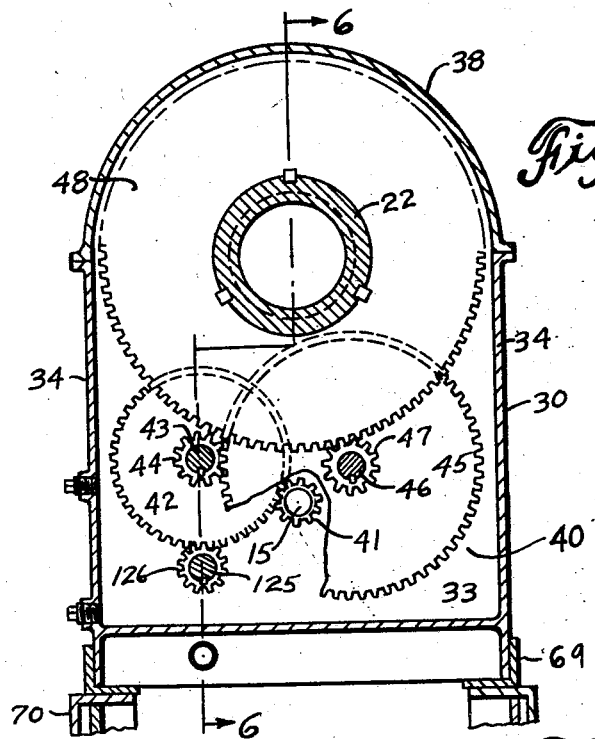
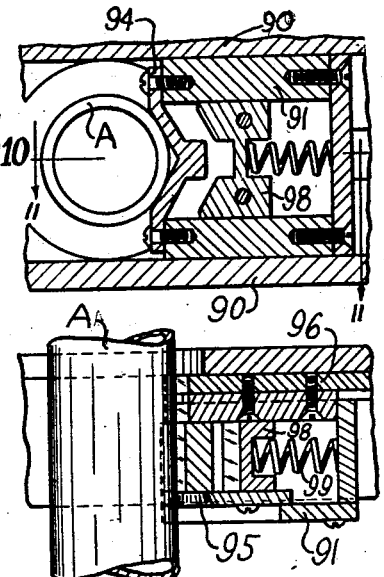
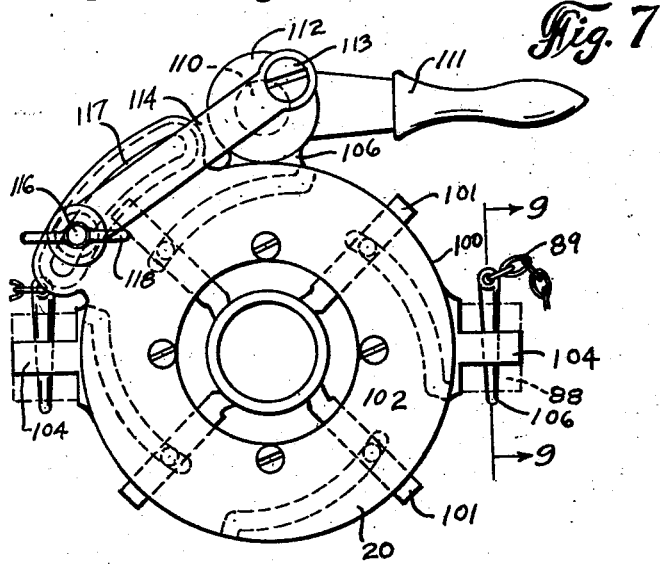
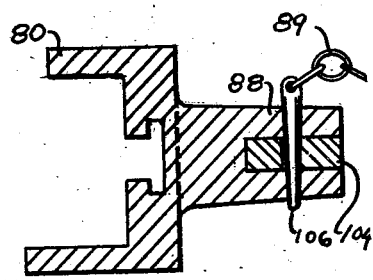

Patented Feb. 20, 1934

1,947,874

UNITED STATES PATENT OFFICE 1,947,874

PIPE THREADING MACHINE

Robert B. Pealer, Warren, Ohio, assignor to The Borden Company, Warren, Ohio, a corporation of Ohio Application September 14, 1931
Serial No. 562,687

8 Claims. (Cl. 10—87)

This invention relates to a power machine for cutting threads and performing other operations on pipes, and is of the type where the pipe is mounted in a chuck rotated by power, and the chasers are mounted in a slidable head and form their own lead after the cutting has started.

Among the objects of the invention is the provision of simple and efficient means for readily setting the chasers for different sizes of pipe, and for withdrawing the chasers radially to free them from the pipe, allowing the pipe to pass through the chaser-carrier to be acted on by a pipe cutter or other tool located beyond the threading unit.

Another object is to provide for a quick interchange of threading tools by mounting the chasers in a head adapted to be firmly locked in position for use, but readily removable when desired, so that a different head may be substituted for a pipe of considerably different size.

Another object of the invention is to provide a means whereby the threading and cutting devices may be readily swung out of the way as a unit, to enable the chuck to operate an extension shaft which may drive a distant tool.

Another object of the invention is to provide the cutting unit in a manner which enables it to be readily set to cause automatically acting knives to engage the pipe, while guides adjacent the knives also engage it to enable a clean-cut to be made while the chuck is rotating the pipe.

And still another object is to so arrange the drive so there will be ample power for rotating the pipe chuck frrom a comparatively small motor through reduction gearing mounted in the standard carrying the chuck, and the general arrangement of the entire machine in a single, compact, and relatively light form adapted to be mounted in a portable carrier.

The means by which I accomplish the above objects in a simple and efficient manner are illustrated in the drawings hereof, and constitute the main features of the present invention, to be hereinafter more fully described and claimed.

Figure 2:
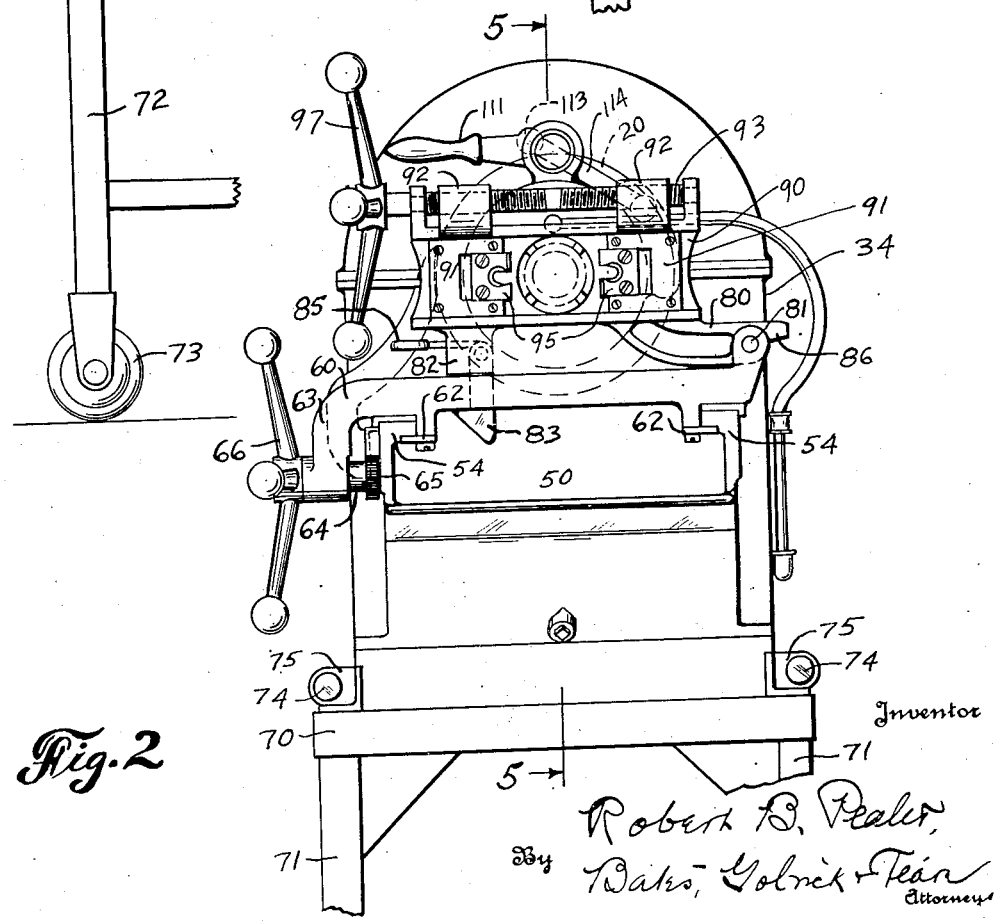

In the drawings, Fig. 1 is a side elevation of the complete machine mounted on its portable carriage partly broken away; Fig. 2 is an end view of the machine looking from the right-hand end of Fig. 1; Fig. 3 is a view similar to Fig. 1, showing the power head driving a distance thread cutter; Fig. 4 is an end elevation similar to Fig. 2, showing the threading and cutting unit swung back to idle position; Fig. 5 is a longitudinal vertical section through the chuck axis and the armature shaft; Fig. 6 is a longitudinal vertical section principally in a plane in front of the plane of Fig. 5, as indicated by the offset line 6—6 on Fig. 7; Fig. 7 is a vertical transverse section through the gear housing which constitutes the chuck standard; Fig. 8 is an elevation showing the face of the chaser carrying head; Fig. 9 is a detail in cross section indicated by the line 9—9 on Figs. 3 and 8; Fig. 10 is a detail in vertical section, in a plane parallel with Fig. 2, illustrating an automatically acting spring carrier for the cutter knife; Fig. 11 is a horizontal section of the same, as indicated by the line 11—11 in Fig. 10.

As illustrated in the drawings, the main operating elements of my machine comprise a driving motor 10, a rotating chuck 20, a hollow standard 30 carrying the chuck and housing reduction gearing 40 connecting it with the motor, a horizontal bed 50, and a threading and cutting unit 60 slidably mounted on such bed. The motor and the frame parts are shown as mounted on a base plate 69, which is secured to the top 70 of a portable table, which is shown as having a pair of legs 71 and a pair 72, the latter carrying rollers 73. The table top and base plate may be made of inwardly facing angle bars. Suitable handles 74 are slidably connected to the base plate, being mounted in ears 75 rigid on the outer sides of the angle bars. When these handles are extended, as shown in Figs. 1 and 3, they provide ready means for lifting the rear end of the table and rolling the whole apparatus about, as desired.

The hollow frame 30, which constitutes the standard for the chuck and also housing the reduction gearing, is best shown in Figs. 1, 5 and 7. It has a horizontally extended lower portion 31 seating within the angle bars of the table top to which it is rigidly secured by rivets 32. The upstanding portion comprises primarily an end wall 33 and front and back walls 34. Slightly beneath the horizontal plane through the axis of the chuck, the front and back walls are narrowed, as at 35, and rigid top portions 36 extend and join the end wall; and these parts carry, centrally, an upwardly facing semicylindrical trough portion 37, which forms the under bearing for the chuck. The housing is closed by a narrow semi-cylindrical cap 38, which has a downwardly extending semi-cylindrical trough-like portion 39 to complete the chuck bearing.

The chuck 20 comprises a rotary head mounted on a flange 21 of a barrel 22 which is journalled in the bearing provided by the housing and cap described. The chuck head may carry any suitable arrangement of radial jaws 24 to grasp the pipe illustrated at A in Fig. 5.

The driving motor 10 is mounted in the central longitudinal axis of the machine, having a base 11 secured to the side bars of the base 69. The armature shaft 12 of this motor lies directly beneath the pipe axis. This armature shaft is coupled by a suitable coupling 14 to a shaft 15 mounted in the end plate 33 of the housing 30. On the inner end of this shaft is the pinion 41, which forms the first element of the reduction gearing to the chuck barrel.

Referring particularly to Fig. 7, the armature pinion 41 will be seen to mesh with a gear 42 mounted on a shaft 43 and carrying a pinion 44. This latter pinion meshes with the gear 45 on a shaft 46 which carries a pinion 47. The pinion 47 meshes with a gear 48 rigidly mounted on the chuck barrel 22. The shafts described are mounted in bosses formed on end wall 33 of the housing, and bosses on the inner face of the vertical closure plate 49, which is bolted to the front and back wall of the housing.

There is thus a triple reduction gearing between the motor and the chuck, giving ample power; and this gearing entirely enclosed within the housing, but accessible when necessary by the removal of the closure plate.

The bed 50, for the slidable cutter head, comprises the hollow box-like frame mounted on the horizontal extension 31 of the housing frame. This box-like frame has, in its lower portion, a rectangular oil sump 51 preferably covered by a removable grating 52, and above this an extended portion 53 carrying a pair of horizontal guides 54. Secured to the outer side of one of these guides 54 is a downwardly facing horizontal rack 55, which is engaged by a positioning pinion on the machining unit about to be described.

The machining unit, which includes chaser-carrying mechanism and the cutter mechanism, their operating parts and the frame parts for them, includes a carriage 60 slidably mounted on the guides 54 held in place by gibs 62 extending beneath the guides. The front of this carriage has a downwardly extending arm 63 which carries a shaft 64 having at its rear end a pinion 65 meshing with the rack 55 and at its front end a suitable hand wheel 66 for rotating the shaft. The turning of this hand wheel therefore serves to shift the whole cutter unit to give it any desired position.

The threading and cutting parts are carried by an arm 80 hinged to the carriage at 81 and having a forward downwardly extending leg 82 normally resting on top of the carriage. Pivoted to this leg is a bell-crank latch 83 normally extending through an opening in the carriage 60 with a nose on the latch engaging the underside of the carriage as shown in Fig. 2. Accordingly, the carriage and the hinged arm, and the parts it carries, operate normally as a unit. Whenever it is desired, however, the arm 80 may be released by the operator pressing down on the forward arm 85 of the bell crank latch releasing the hook, whereupon the arm and the parts it carries may be tipped back into the idle position shown in Fig. 4. The parts will remain in this upright position by gravity, further movement of the arm 80 being prevented by extension 86 of the arm engaging the rear edge of the carriage 60.

On the outer face of the arm 80 is mounted the cutting unit comprising a channel shaped portion 90 preferably integral with the arm and constituting a horizontal guideway in which are mounted a pair of movable blocks 91, each having a T-shaped gib 96 engaging a groove in the arm 80, and each having an internally threaded ear 92, Figs. 5 and 6, meshing with a right-and left-hand screw 93 journalled in ears carried by the arm. Each block 91 suitably carries a cutter blade 95. A suitable hand wheel 97 furnishes means for rotating the right-and left-hand screw 93, whereby the cutter blades may be brought up into engagement with the pipe, or freed therefrom, as desired. When engaged, if the cutters are secured fixedly to the blocks 91, they may be fed from time to time by turning the handle 97, but I prefer to mount the blades on slidable blocks backed by springs, within hollow blocks 91, so that the feeding of the blades to effect the cutting will be automatic, the springs being compressed by the rotation of the hand wheel.

Figs. 10 and 11 of the drawings illustrate particularly the automatic spring feeding of the cutters just referred to, after the manner of Patent No. 1,282,619, issued to my assignee, The Borden Company, October 22nd, 1918. As shown in these figures, and as illustrated and claimed in that patent, the blocks 91 are hollow members terminating at their inner ends in closure plates 94, which have V-shaped grooves in them, as shown in Fig. 10 to enable them to engage the pipe indicated at A and act as a guide, during the cutting. Within the hollow box-like members 91 are blocks 98 pressed toward the closure plates by springs 99. The knife 95 is secured to this block 98.

It results from the construction just described that the turning of the hand-wheel 97 may bring the two blocks 91 toward each other; then when the knives 95 engage the pipe, a further turning of the hand-wheel further advances the blocks 91 until the closure plates 94 engage the pipe, the knives remaining against the pipe. Thus, when the guide plates 94 have been brought against the pipe, the knives are under a substantial pressure from the compressed springs 99, and hence, the knives are automatically fed into the pipe as the rotation continues, and thus cause the cutting.

The guides 94 are important in positioning the pipe at the cutter, as the chuck which holds the pipe is necessarily a considerable distance from the knives, and these guide plates 94 cooperate with the chuck to effectively hold the pipe during its rotation between the cutting knives, causing a clean-cut.

The arm 80 on the opposite side from the cutter carries the threading unit. This comprises a ring 100, having radial passageways to carry chasers 101, a scroll or cam plate 102 for positioning the cam plate. The ring 100 has ears 104 on diametrically opposite sides, which enter bifurcated lugs 88 of the arm 80. The ears are normally locked in these bifurcated lugs by tapered pins 106 passing through the lugs and openings in the ears, these pins being retained by suitable chains 89 anchored to the arm 80.

The construction described enables the ready removal of the entire head 100 and the parts it carries, and the substitution of a different head and chaser parts. Preferably, the chasers are adjustable in the head for different sizes of pipe, not to exceed four sizes, but by removing the head and the parts it carries and substituting another head, provision is made for several additional sizes.

The ring 100, which contains the radial grooves carrying the chasers 101, is provided with an ear 106 in which is mounted a short shaft 110 carrying an operating handle 111. On this shaft is a disc crank 112, the pin 113 of which is connected by a link 114 with the cam plate 102. The connection is made by means of a bolt 116 occupying an arcuate slot 117 in an extension of the cam plate, the bolt having a wing nut 118 by which it may be tightened. Upon loosening this wing nut, the cam plate may be readily shifted to shift the chasers in or out and position them as desired. The wing nut is then locked with the lever 111 in the position shown in Fig. 8.

To open the threading unit and allow the free passage of the pipe, it is only necessary for the operator to grasp the handle 111 and throw it to the rear; and this, by reason of the crank arm 112, shoves the link 114 and swings the cam plate well around, sufficiently to withdraw all of the chasers to idle position. This allows the pipe to pass freely through the chaser frame so that the cutter may be brought into action beyond the thread which has been cut on the pipe, while the pipe still remains chucked.

It will be noticed from Fig. 8 that the normal position of the handle 111, the crank pin 113 is almost on the dead center so that, with the handle in this position, the chaser head will maintain its position without requiring any special lock.

The loosening of the wing nut 118 enables the cam plate, whenever desired, to be turned to its extreme limit, and in that position, if the handle 111 is thrown to the rear, the cam grooves, by reason of their radially extending outward ends, will release the chasers entirely and allow them to be removed from the machine, as will be readily understood.

In the operation of my machine, after the dies have been set to proper size, the pipe chucked, and the motor started, the operator turns the hand wheel 66 to press the chasers against the end of the pipe, and then, after the threading has started, the chasers make their own lead and the threading continues automatically so long as the motor is running. The motor switch 18 is conveniently located to be grasped by the left hand of the operator standing facing the machine.

The motor is reversible, preferably under the control of the single switch 18; thus the machine may be used for cutting right or left-hand threads, the chasers being selected accordingly.

At the end of the threading operation, the operator simply throws back the handle 111 to spread the chasers. He may then unchuck the pipe and, if desired, shove it through the chaser head to bring a region for cutting off the threaded portion between the knives of the cutter, and then tighten the chuck and seat the cutter blades by their hand wheel and start the motor for cutting operation.

To enable the chuck to be rapidly set or unset, I prefer to provide the head 20 with a radial socket or sockets 26 geared within the head with the jaws. A suitable T-shaped socket wrench may thus readily operate the jaws as a unit. Should this wrench be inadvertently standing in the head when the motor is turned on, the wrench will be automatically extracted by either of two pairs of fingers 28 located at the front and back of the head and adapted to receive the wrench shank between them.

I have referred to the oil sump 51 formed in the lower portion of the bed 50. I provide a pipe 120 leading from this oil sump to a pump 121 operated by the motor and forcing oil to a pipe 122 which may discharge it at 123 adjacent the teeth of the chasers and onto the pipe being threaded, the surplus oil caught in the tray 124 being returned to the sump. The pump 121 is preferably of the rotary type, operated by a shaft 125 carrying a pinion 126 meshing with the gear 42 of the train of reduction gearing within the vertical standard.

The machine which I have described is well adapted for furnishing power for operating various machines which may be suitably positioned and connected to the chuck. By throwing back the machining head of the machine to idle position, I may clamp one end of a universal tumbler shaft within the chuck and use the other end for driving some distant tool. This is illustrated in Fig. 3, where the tumbler shaft 130 has intermediate portion connected at one end by universal joint to a short stud 131 which may be clamped in the chuck 20, and, at its other end, by universal joint to a short stud 132 which may operate the machine to be driven.

As illustrated in Figure 3, the driven machine comprises a threading member having a rotating head 134 carrying chasers 135, this head being connected by gearing 136 with rotary driving sleeve with which the shaft 132 makes a splined connection. The pipe B in this case is held stationary in a suitable vise and the chaser carrying frame rotates about it to cut the thread indicated at $b$.

It will be understood from the description given that my machine has a large number of applications and is adapted for many uses arising in connection with plumbing, steam fitting, et cetera; it may be readily rolled from place to place and positioned in the most convenient location; pipes of indefinite length may be readily supplied to the machine and chucked for rapid threading or cutting operations; chasers may be readily set within their range of positions, or a different set of chasers substituted to provide for a large number of sizes of pipe. The provision for tipping back the whole cutting unit into an idle position enables the use of the extension shaft for driving some other machine, which need not be accurately aligned with the driving chuck.

I claim:

1. In a machine of the character described, the combination of a rotary chuck, mechanism for driving the same, a bed, a carriage slidable upon the bed, an arm hinged to the carriage out of alignment with the chuck bore, a thread cutting unit carried by the arm on one side thereof and a pipe cutting unit carried by the arm on the opposite side thereof, and means for latching the arm to the carriage in operating position.

2. In a machine of the character described, the combination of a rotary chuck, mechanism for driving the same, a bed, a carriage slidable upon the bed, an arm hinged to the carriage out of alignment with the chuck bore, a thread cutting unit carried by the arm on the side thereof adjacent the chuck, a pipe cutting unit carried by the arm on the opposite side thereof, means on the arm for spreading the chasers and for setting the pipe cutters, means at the rear of the arm for hinging it to the carriage, and means for latching the forward portion of the arm to the carriage.

3. The combination of a chuck adapted to be rotated, a slidable carriage, a member hinged to the carriage on an axis at one side of the chuck axis and parallel therewith, a removable ringlike member carrying chasers and having projections on opposite sides coacting with projections on the member hinged to the carriage, the projections on one of said members being bifurcated to receive the projections on the other member, and pins occupying openings in the projections for locking said members together.

4. The combination of a chuck, mechanism for rotating the same, a bed, a carriage slidably mounted on the bed, an arm hinged to the carriage, a threading unit mounted on one side of the arm, a pair of cutter knives slidably carried on the other side of the arm on opposite sides of the chuck axis respectively, springs bearing on said knives, and means mounted on the arm for moving both knives toward and from the pipe axis and for constraining both of said springs.

5. The combination of a chuck, means for rotating the chuck, a sliding carriage, an arm hinged to the carriage on an axis parallel with the chuck axis and at one side thereof, a threading device and a cutting device mounted on the arm and adapted to act on a pipe in the chuck, said cutting device comprising a pair of blocks on opposite sides of the pipe, each having recessed heads adapted to engage the pipe to center it, a pair of knives carried by a pair of said blocks respectively and spring-pressed toward the pipe axis, and a right- and left-hand screw for feeding the two blocks with their respective knives simultaneously toward or from the pipe axis.

6. In combination, a chuck, mechanism for rotating the same, a bed, a carriage slidable upon the bed, an arm hinged to the carriage, the hinge being so located relative to the carriage and the chuck as to render the arm capable of moving out of the path of the work, a threading head mounted upon the arm, and a cutting device mounted upon the arm and comprising knives on opposite sides of the axis, and means for simultaneously moving the knives toward and from each other.

7. The combination with a chuck, mechanism for rotating the same, a bed, a carriage slidable upon the bed, an arm hinged to the carriage, the hinge being so located relative to the carriage and the chuck as to render the arm capable of moving out of the path of the work, an annular frame mounted on the arm, chasers carried by the frame adapted to cut a thread on the pipe carried by the chuck, means adapted to cut such pipe, and a self-centering steadying device carried by the arm, comprising positioning blocks on opposite sides of the pipe and means for simultaneously moving the two blocks toward each other.

8. The combination of a chuck, mechanism for rotating the same, a bed, a carriage slidable upon the bed, an arm hinged to the carriage, the hinge being so located relative to the carriage and the chuck as to render the arm capable of moving out of the path of the work, a pipe-threading mechanism mounted on the arm, a pipe-cutting mechanism on the arm comprising a pair of pipe-engaging blocks and a pair of knives carried by the blocks respectively, the said blocks and knives being symmetrically positioned with reference to the pipe axis, and means for simultaneously moving such blocks and knives toward or from the axis.

ROBERT B. PEALER.